(12) United States Patent
Thummala Abbigari et al.

(10) Patent No.: US 11,792,285 B2
(45) Date of Patent: *Oct. 17, 2023

(54) RECIPIENT-BASED FILTERING IN A PUBLISH-SUBSCRIBE MESSAGING SYSTEM

(71) Applicant: Salesforce, Inc., San Francisco, CA (US)

(72) Inventors: Sivananda Reddy Thummala Abbigari, Castro Valley, CA (US); Lawrence Eugenio McAlpin, Bloomington, IN (US); Vikram Kommaraju, Dublin, CA (US); John Arlan Brock, Oakland, CA (US); Soumen Bandyopadhyay, Castro Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/307,662

(22) Filed: May 4, 2021

(65) Prior Publication Data

US 2021/0306435 A1 Sep. 30, 2021

Related U.S. Application Data

(63) Continuation of application No. 17/024,180, filed on Sep. 17, 2020, now Pat. No. 11,032,385, which is a
(Continued)

(51) Int. Cl.
*G06F 15/173* (2006.01)
*H04L 67/55* (2022.01)
(Continued)

(52) U.S. Cl.
CPC ............ *H04L 67/55* (2022.05); *H04L 51/214* (2022.05); *H04L 67/10* (2013.01)

(58) Field of Classification Search
CPC ................................ H04L 67/55; H04L 67/10
See application file for complete search history.

(56) References Cited

U.S. PATENT DOCUMENTS 5,862,325 A * 1/1999 Reed ...................... H04L 67/60
709/212
5,892,909 A 4/1999 Grasso et al.
(Continued)

FOREIGN PATENT DOCUMENTS

EP 3229151 A1 10/2017
WO 2018/097975 A1 5/2018

OTHER PUBLICATIONS

"Kafka 1.1 Documentation," 2017, 390 pages, Apache Kafka, Downloaded from https://kafka.apache.org/11/documentation.html on Oct. 31, 2019.
(Continued)

*Primary Examiner* — Thanh T Nguyen
(74) *Attorney, Agent, or Firm* — NDWE, LLP

(57) ABSTRACT

Implementations are described which provide for recipient-based filtering of an event that relates to a topic to which consumers are subscribed. Responsive to determining that an attribute of the event includes a set of one or more identifiers for intended recipients for the event, the event is delivered to consumers that correspond to the intended recipients. Alternatively, responsive to determining that the attribute of the event does not include a set of one or more identifiers for intended recipients for the event, the event is delivered to all of the consumers subscribed to the topic to which the event relates.

18 Claims, 6 Drawing Sheets

Related U.S. Application Data continuation of application No. 16/671,148, filed on Oct. 31, 2019, now Pat. No. 10,812,608.

(51) Int. Cl.
  *H04L 67/10* (2022.01)
  *H04L 51/214* (2022.01)

(56) References Cited

U.S. PATENT DOCUMENTS

| | | | |
|---|---|---|---|
| 6,345,288 | B1 | 2/2002 | Reed et al. |
| 7,730,478 | B2* | 6/2010 | Weissman ............ G06F 16/2365 717/176 |
| 7,747,730 | B1 | 6/2010 | Harlow |
| 8,612,397 | B2* | 12/2013 | Henderson ............ G06F 16/288 707/687 |
| 9,323,902 | B2* | 4/2016 | Petrovic ............. H04N 1/00854 |
| 9,417,840 | B2 | 8/2016 | Pradeep et al. |
| 9,710,127 | B2 | 7/2017 | Torman et al. |
| 9,729,556 | B2 | 8/2017 | Brock |
| 9,767,022 | B2 | 9/2017 | Pradeep et al. |
| 9,774,603 | B2* | 9/2017 | Brock ................. G06F 21/6227 |
| 10,178,156 | B2 | 1/2019 | Pradeep et al. |
| 10,275,281 | B2* | 4/2019 | Pradeep ................. G06F 11/00 |
| 10,298,582 | B2* | 5/2019 | Syomichev ........... H04L 67/561 |
| 10,332,129 | B2 | 6/2019 | Torman et al. |
| 10,339,126 | B2 | 7/2019 | Pradeep et al. |
| 10,394,412 | B2 | 8/2019 | Torman et al. |
| 10,536,463 | B2 | 1/2020 | Syomichev et al. |
| 10,592,474 | B2 | 3/2020 | Torman et al. |
| 2002/0095454 | A1 | 7/2002 | Reed et al. |
| 2002/0165912 | A1* | 11/2002 | Wenocur ................. H04L 65/80 709/203 |
| 2002/0178360 | A1 | 11/2002 | Wenocur et al. |
| 2002/0194483 | A1 | 12/2002 | Wenocur et al. |
| 2002/0194501 | A1 | 12/2002 | Wenocur et al. |
| 2002/0196935 | A1* | 12/2002 | Wenocur .............. G06Q 10/107 380/37 |
| 2002/0199001 | A1 | 12/2002 | Wenocur et al. |
| 2002/0199096 | A1 | 12/2002 | Wenocur et al. |
| 2003/0009694 | A1 | 1/2003 | Wenocur et al. |
| 2003/0041110 | A1 | 2/2003 | Wenocur et al. |
| 2003/0135556 | A1 | 7/2003 | Holdsworth |
| 2005/0060643 | A1 | 3/2005 | Glass et al. |
| 2006/0293956 | A1 | 12/2006 | Walker et al. |
| 2009/0132490 | A1 | 5/2009 | Okraglik |
| 2010/0159883 | A1 | 6/2010 | Pascal et al. |
| 2011/0191425 | A1 | 8/2011 | Brodeur et al. |
| 2013/0007024 | A1 | 1/2013 | Plattner et al. |
| 2013/0007847 | A1 | 1/2013 | Plattner et al. |
| 2014/0006951 | A1 | 1/2014 | Hunter |
| 2014/0180809 | A1 | 6/2014 | Boal |
| 2015/0106736 | A1 | 4/2015 | Torman et al. |
| 2015/0127670 | A1 | 5/2015 | Torman et al. |
| 2015/0262219 | A1 | 9/2015 | Vock et al. |
| 2016/0063270 | A1 | 3/2016 | Brock et al. |
| 2016/0077798 | A1 | 3/2016 | Pradeep et al. |
| 2016/0080461 | A1 | 3/2016 | Pradeep et al. |
| 2016/0156580 | A1 | 6/2016 | Krka et al. |
| 2016/0225059 | A1 | 8/2016 | Chow |
| 2016/0269340 | A1 | 9/2016 | Nano |
| 2017/0060741 | A1 | 3/2017 | Pradeep et al. |
| 2017/0075922 | A1 | 3/2017 | Torman et al. |
| 2017/0195438 | A1 | 7/2017 | Schneider et al. |
| 2017/0293632 | A1 | 10/2017 | Pradeep et al. |
| 2018/0025113 | A1 | 1/2018 | Torman et al. |
| 2019/0140997 | A1 | 5/2019 | Lewin-Eytan et al. |
| 2020/0004877 | A1 | 1/2020 | Ghafourifar et al. |
| 2020/0027126 | A1 | 1/2020 | Zhao et al. |
| 2020/0059376 | A1 | 2/2020 | Slovetskiy |
| 2020/0097373 | A1 | 3/2020 | Zhao |
| 2020/0099752 | A1 | 3/2020 | Naidu et al. |
| 2020/0357406 | A1 | 11/2020 | York et al. |

OTHER PUBLICATIONS

"Kafka 2.0 Documentation," 2017, 444 pages, Apache Kafka, Downloaded from https://kafka.apache.org/20/documentation.html on Oct. 31, 2019.

"Kafka 2.1 Documentation," 2017, 458 pages, Apache Kafka, Downloaded from https://kafka.apache.org/21/documentation.html on Oct. 30, 2019.

"Kafka 2.2 Documentation," 2017, 481 pages, Apache Kafka, Downloaded from https://kafka.apache.org/22/documentation.html on Oct. 30, 2019.

Belokosziolszki, Andras, "Role-Based Access Control for Publish/Subscribe Middleware Architectures," 2003, 3 pages, ACM.

GNU Mailman—List Member Manual, 1.2 What is a mailing list?, Feb. 26, 2019, 1 page, Downloaded from http://www.list.org/mailman-member/node5.html on Sep. 3, 2019.

Non Final Office Action, U.S. Appl. No. 17/024,180, dated Oct. 29, 2020, 5 pages.

Notice of Allowance, U.S. Appl. No. 17/024,180, dated Feb. 4, 2021, 11 pages.

Notice of Allowance, U.S. Appl. No. 16/671,148, dated Jun. 18, 2020, 10 pages.

Onica, Emanuel, "Confidentiality-Preserving Publish-Subscribe: a Survey," 2016, 41 pages, vol. 49, Issue 2, ACM.

* cited by examiner

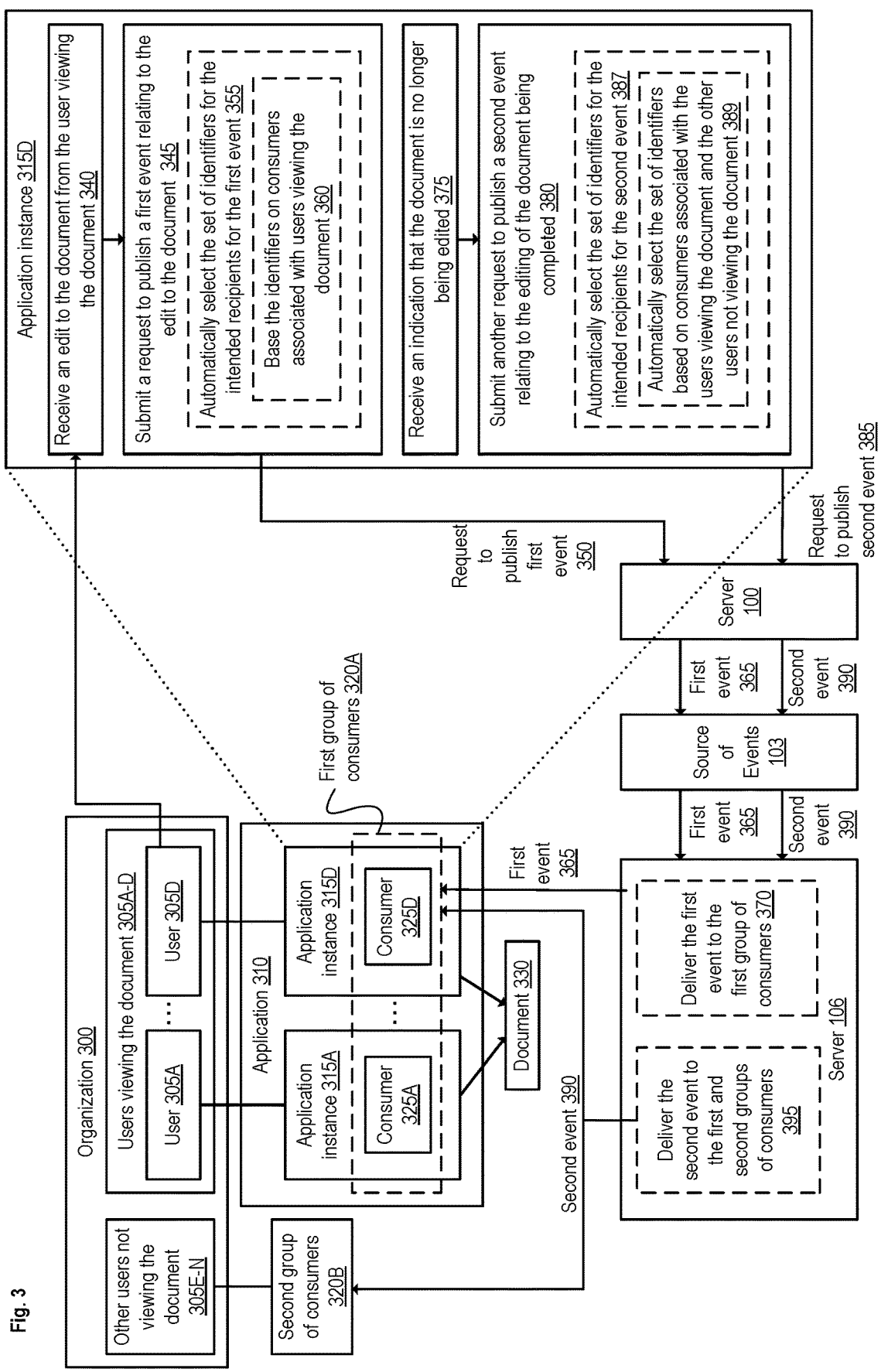

RECIPIENT-BASED FILTERING IN A PUBLISH-SUBSCRIBE MESSAGING SYSTEM

CROSS-REFERENCE TO RELATED APPLICATIONS

This application is a continuation of application Ser. No. 17/024,180, filed Sep. 17, 2020, which is a continuation of application Ser. No. 16/671,148, filed Oct. 31, 2019, which is hereby incorporated by reference.

TECHNICAL FIELD

One or more implementations relate to the field of publish-subscribe messaging systems; and more specifically, to recipient-based filtering in such systems.

BACKGROUND ART

A publish-subscribe messaging system (a "pub-sub system") allow a publisher of an event (also referred to as a message) to publish the event without knowledge of the consumers subscribed to that topic. An event is any identifiable unit of data that conveys information about an occurrence or entity in a computing system and a topic is a common characteristic of events. For example, an event may convey that a document has been modified and relate to a topic concerning that document. A consumer consumes events (e.g., after subscribing to receive events in a pub-sub system) and a publisher publishes an event (i.e., causes the event to be made available in a source of data).

Typically, publish-subscribe message systems provide topic-based filtering. In topic-based filtering, 1) an event is related to and consumers subscribe to one or more topics, and 2) an event is filtered to be delivered to a consumer based on a) the topics to which the consumer has subscribed and b) the topic to which the event relates.

The scalability of a typical pub-sub system is limited by the number of topics that the system supports. Also, an event that relates to a topic will be delivered to all consumers that have subscribed to receive events that relate to the topic, over which the publisher has limited control (e.g., the publisher can choose not to publish a message to avoid that message being delivered to all such consumers).

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3 is a diagram showing an exemplary application using recipient-based filtering in a publish-subscribe messaging system.

DETAILED DESCRIPTION

The following description describes implementations for recipient-based filtering of an event that relates to a topic to which consumers are subscribed. Recipient-based filtering, in the context of events, is filtering of an event to be delivered to a consumer based on intended recipients for that event (i.e., a recipient to which an event is intended to be delivered). Typical pub-sub systems allow a publisher of the event to publish it without knowledge of the consumers subscribed to the topic. By changing the publish-subscribe paradigm, implementations described herein may provide finer-grained control over delivery of events to consumers by performing recipient-based filtering, and thus improve flexibility for publishers, relevance for consumers, and/or efficient use of computing resources in publish-subscribe messaging.

Recipient-Based Filtering and Selective Delivery

Figure 1A:
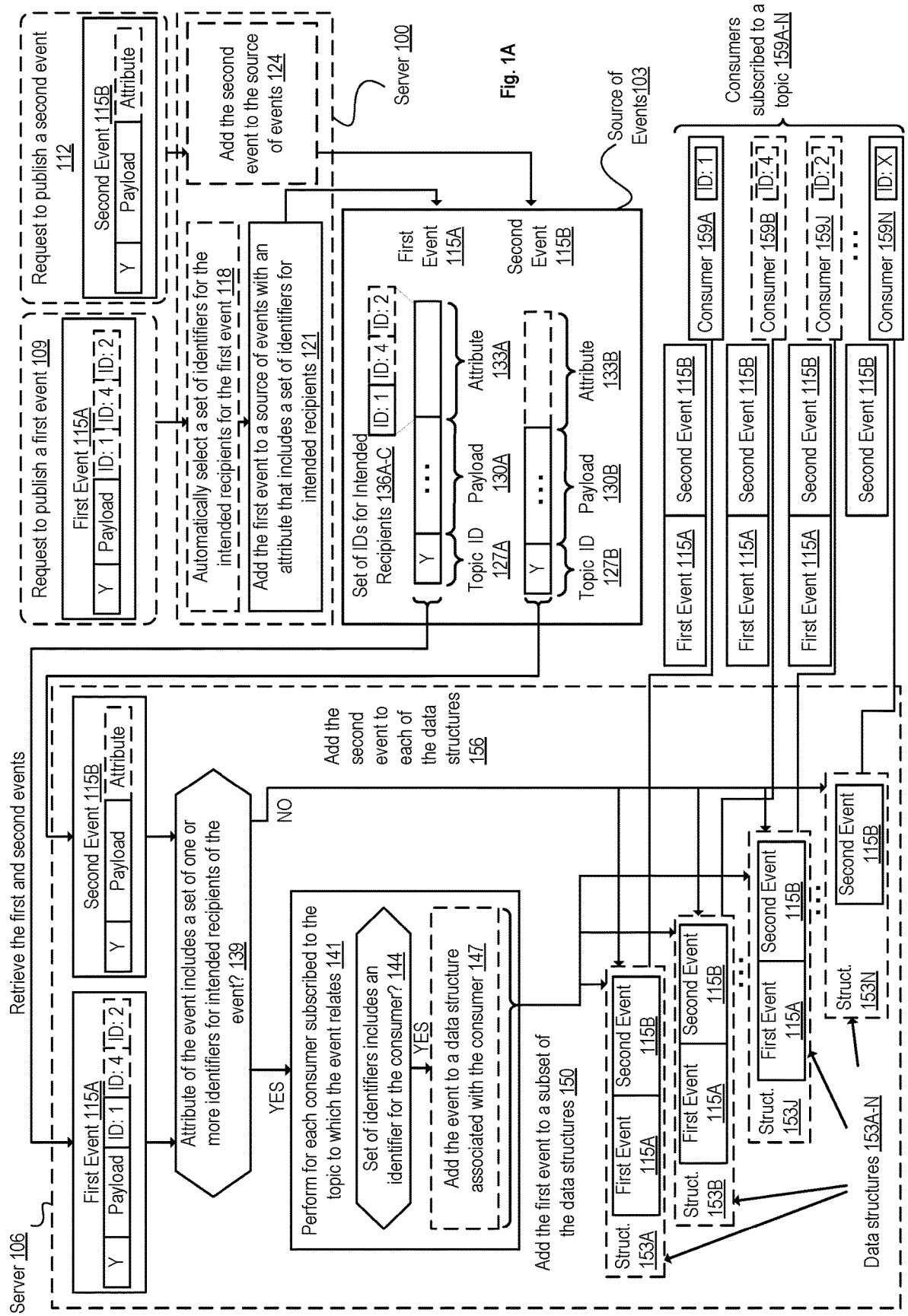
FIG. 1A is a block diagram showing a system for recipient-based filtering in a publish-subscribe messaging system, according to some example implementations.

FIG. 1A is a block diagram showing a system for recipient-based filtering in a publish-subscribe messaging system, according to some example implementations. FIG. 1A shows a server 100, a source of events 103, and another server 106. A request to publish a first event 109 includes data for a first event 115A. Typically, an event includes one or more attributes. An attribute (also referred to as a field) of an event is a part of an event that contains one or more values. The attributes included in an event can be referred to as a payload or a body of the event (and may or may not include an identifier (ID) for a topic (also referred to as a topic ID) and other attributes). However, some implementations support an event including a header, which may be separate from or included in the body of the event and which may include one or more attributes. The data for the first event includes: 1) topic ID 127A (with a value of "Y"), a payload 130A (for which values are not shown), and an attribute 133A that includes a set of IDs for intended recipients 136A-C (i.e., intended recipients for the first event 115A). Included in the exemplary set of IDs for intended recipients is an ID with value "1" and optionally other IDs with values "4" and "2."

Adding an Event to a Source of Events

Figure 1B:
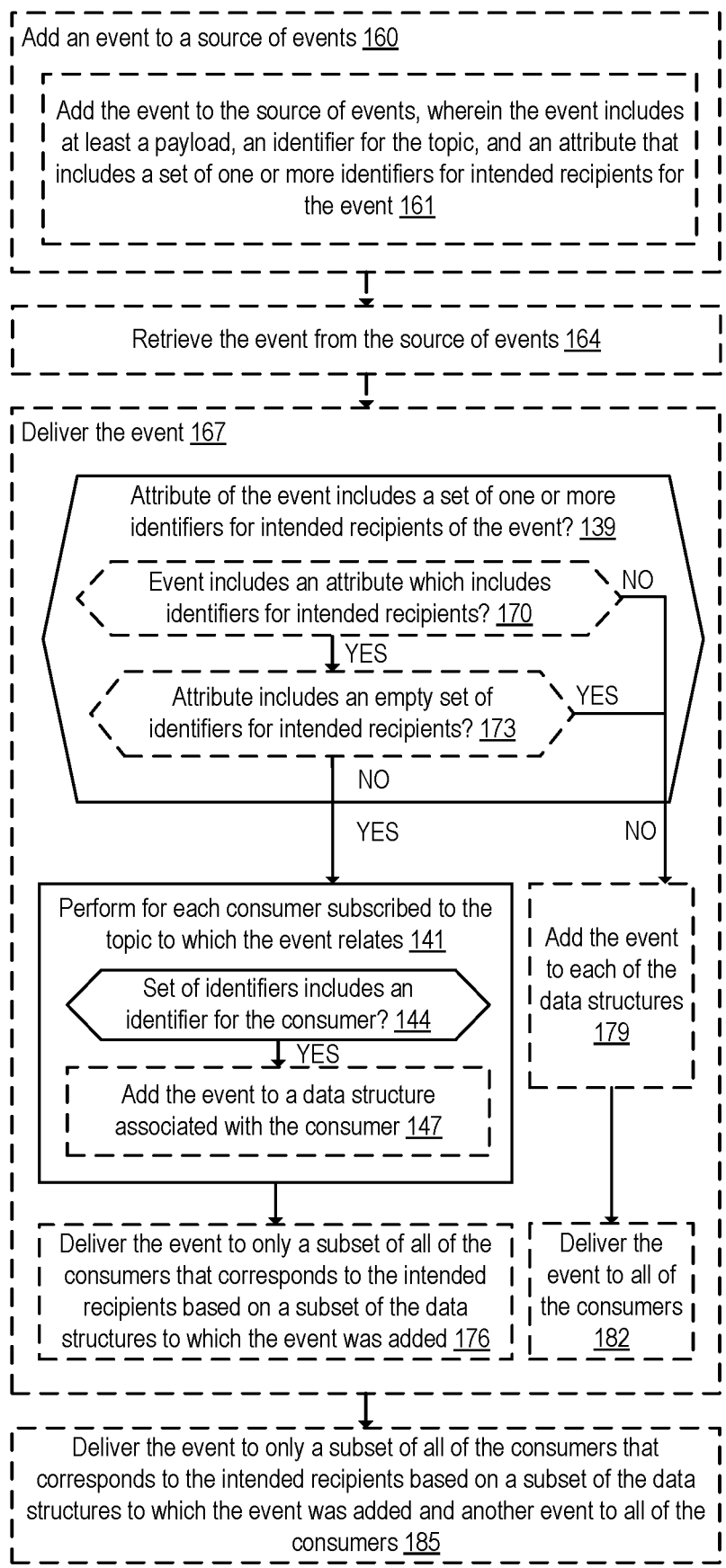
FIG. 1B is a flow diagram showing operations for recipient-based filtering in a publish-subscribe messaging system, according to some example implementations.
Figure 1C:
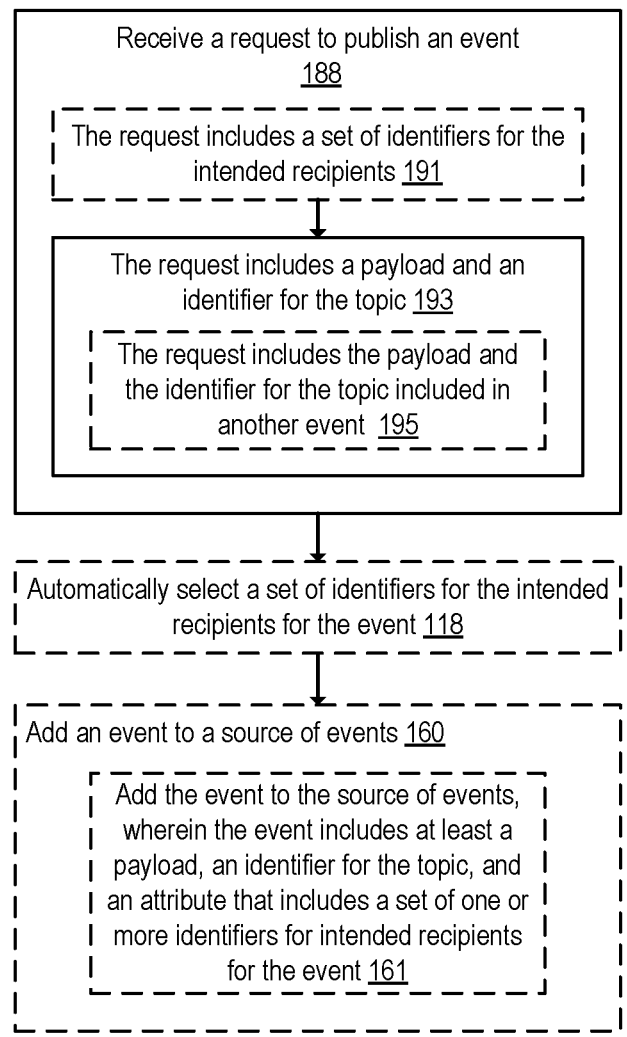
FIG. 1C is a flow diagram showing operations for adding an event to a source of events, according to some example implementations.

Implementations may support different ways of receiving a request to publish an event. A request to publish an event is a request to make an event available in a source of events. With reference to FIG. 1C, some implementations include different optional blocks in block 188 wherein a request to publish an event is received. For example, implementations may include block 191, where the request includes a set of identifiers for the intended recipients. An identifier is data that identifies (e.g., an intended recipient of an event). In some implementations, an identifier may be a unique identifier (i.e., an identifier that identifies a single entity, such as a single intended recipient); in other implementations, an identifier may be non-unique (i.e., identifies multiple entities). The request includes a payload and an identifier for a topic per block 193. Optionally, the payload and the identifier for the topic are included in another event per block 195. Thus, implementations may support 1) a request including data for an event, the data including a payload and a topic ID, 2) that data being included in another event, and/or 3) the request including a set of identifiers for intended recipients.

Supporting these different ways of receiving a request allows for creating an event from data, creating an event based on another event which includes that data, and/or creating an event with a set of IDs for intended recipients provided in the request. These options provide different possibilities for interfacing with existing pub-sub systems. For example, an implementation can be added on to an existing pub-sub system, an event published in that system can be received in block 188, and the event enhanced with a set of identifiers for recipient-based filtering. Additionally or alternatively, before an event is created in an existing pub-sub system, an implementation can receive data in block 188 from which the event is created.

In block 118, a set of IDs for the intended recipients for the event can be automatically selected. This may occur, for example, when a set of IDs is not provided in a request. Automatically selecting the set of IDs may be based on one or more of 1) the topic ID included in the request; 2) the payload included in the request; 3) the publisher of the event (i.e., the component, user, application, etc. which submitted the request to publish the event (if known)); 4) the IDs included in sets of IDs for other events (e.g., which relate to the same or related topic IDs, which share common attributes and/or values for those attributes, which were published by the same publisher or related publishers (e.g., publishers from the same organization, user group, and/or role; publishers from the same application and/or application instance; etc.)); 5) one or more consumers that have registered with the server; 6) one or more consumers that are flagged or otherwise determined as active (e.g., have indicated to the server of source of events that they are currently receiving events, that have been included in a set of IDs for a given number of events over a given period of time); 7) one or more consumers included in one or more application instances currently used by one or more users; etc. Automatically selecting IDs based on one more of these and/or other factors gives an implementation a powerful and flexible way of performing recipient-based filtering in a pub-sub system. Some implementations may allow automatic selection to occur based on a set of one or more rules (e.g., which can be processed by a rules engine to perform the automatically selecting IDs) captured in various ways (e.g., in a text file, through a user interface, etc.).

Automatically selecting a set of IDs for the intended recipients may be useful even when a set of IDs is provided in the request. For example, the automatically selected set might be provided as a proposed set of intended recipients (e.g., to a user of an application instance which is publishing an event), or only those automatically selected intended recipients which were not included in the set of IDs provided in the request might be proposed. In another example, automatically selecting the set of IDs for intended recipients may define the set of possible intended recipients for an event (e.g., to enforce privileges and/or roles accorded to the user, publisher, and/or intended recipient(s) provided in the request), and thus the set of IDs for intended recipients taken from the intersection of the set of IDs provided in the request and those automatically selected.

As shown in FIG. 1A, block 118 for automatically selecting a set of IDs for the intended recipients for the second event may be implemented in server 100 (which adds one or more events to a source of events). Additionally or alternatively, block 118 may be implemented in an application (not shown). For example, an application may perform block 118 based on the context of (e.g., data available to) one or more instances of the application. Such an example is discussed in relation to FIG. 3. Where block 118 is implemented outside the server 100, the server may call block 118 via a callback or another mechanism (e.g., a function pointer, a functor, an application programming interface (API) endpoint, a webservice, etc.) to execute the block and receive the set of IDs for the intended recipients for the event that were automatically selected.

Returning to block 121 in FIG. 1A, the first event is added to a source of events 103 with an attribute that includes a set of IDs for intended recipients. In block 124, a second event is added to the source of events 103. The second event 115B includes a topic ID 127B (with value "Y") and a payload 130B (for which values are not shown) and an attribute 133B. In contrast to the first event 115A, the second event 115B does not include a set of IDs for intended recipients in attribute 133B. In some implementations, the attribute 133B is optional, and may not be provided in the request to publish a second event 112 (as indicated by the dashed lines around the attribute with text "Attribute").

As described herein, a source of events (such as source of events 103) is a source from which events can be read by a consumer; e.g., an event bus or message bus, a stream, a cache, a database, a datastore, a file, etc. In some implementations, a publisher could be considered a source of events if the publisher is a source from which a consumer can read events. With reference to FIG. 1B, an event is added to a source of events in block 160 (cf. blocks 121 and 124 shown in FIG. 1A). The event may include at least a payload, an identifier for the topic, and an attribute that includes a set of one or more identifiers for intended recipients for the event, per block 161.

After the first and second events have been added to the source of events 103, server 106 can retrieve those events respectively in block 164, wherein an event is retrieved from the source of events. In other implementations, one or more events can be submitted to server 106 (e.g., by another component which reads the events from the source of events 103 and submits them to server 106). In yet other implementations, server 100 and server 106 may be combined and the operations performed by server 100 and server 106 performed by a single server.

Delivering an Event

Server 106 may implement one or more of the blocks shown in FIG. 1B (some of which are also shown in FIG. 1A). In block 167, an event is delivered. This delivery is selective in that it is based on the outcome of one or more of the decision blocks included in block 167. As part of block 167, block 139 includes determining whether an attribute of the event includes a set of one or more identifiers for intended recipients of the event. An implementation can perform this determination in different ways; e.g., block 139 may identify whether any attributes included in the event have a well-defined identifier for including a set of IDs for intended recipients (e.g., an attribute with a name such as "recipients" or a corresponding identifier, which may be unique for attributes that include a set of IDs for intended recipients). Additionally or alternatively, an implementation might identify whether values of attributes included in the event include a set of IDs for intended recipients (e.g., if a unique identifier for such an attribute is not used). Block 139 optionally includes block 170, which includes determining whether the event includes an attribute which includes identifiers for intended recipients. If the event does include such an attribute, flow passes from block 170 to block 173, while if the event does not include such an attribute, flow passes from block 170 to block 179. Optional block 173 includes determining whether the attribute includes an empty set of identifiers for intended recipients. If the attribute does include an empty set, flow passes from block 173 to block 179, while if the attribute does not include an empty set (i.e., includes a non-empty set), flow passes from block 173 to block 141. Thus, the optional blocks in block 139 support implementations where 1) an event does not have an attribute which includes IDs for intended recipients; and 2) an event has such an attribute but that attribute includes an empty set of IDs.

Where an attribute of the event includes a non-empty set of IDs for intended recipients, flow passes to block 141 as discussed. Block 141 includes operations that are performed for each consumer subscribed to the topic to which the event relates. In some implementations, the consumers subscribed to the topic are known to server 106 (e.g., the consumers registered with server 106 which stores or has access to IDs for those consumers). In other implementations, server 106 receives IDs for those consumers (e.g., by querying a registry, by querying other servers with which consumers have registered, etc.). In yet other implementations, each server of a group of servers may perform block 141 with regard to the consumers known to that server, and the servers communicate with each other (e.g., a first server of the group might indicate to others of the group that block 141 is to be performed for the consumers).

Implementations are described where, for each consumer subscribed to the topic, block 144 determines whether the set of IDs included in the attribute includes an ID for the consumer. However in alternative implementations (not shown), for each ID in the set of IDs, a block determines whether the ID is an ID for a consumer subscribed to the topic. The different approaches may provide different performance characteristics depending on one or more factors including 1) the number of IDs in the set of IDs, 2) the number of consumers subscribed to the topic (and/or the consumers for which block 141 is executed by the server), and/or 3) whether the IDs include IDs for consumers which are not subscribed to the topic (which may occur, for example, if a consumer has unsubscribed, if an ID was erroneously included, etc.) or to which the event cannot be delivered (e.g., due to lack of privileges of the publisher and/or consumer, due to unavailability, etc.). For example, if the set of IDs includes a relatively small number of IDs and the number of consumers subscribed to the topic is relatively large, determining whether an ID corresponds to that of a consumer might result in fewer iterations than determining whether a consumer's ID is included in the set. Conversely, if the set of IDs includes a relatively large number of IDs and the number of consumers subscribed to the topic is relatively small, determining whether a consumer's ID is included in the set might result in fewer iterations than determining whether an ID corresponds to that of a consumer. If the set of IDs includes IDs of consumers not subscribed to the topic, determining whether a consumer's ID is included in the set will obviate trying to determine a corresponding consumer. Some implementations may support both of these approaches and select one automatically depending on the factors mentioned, the performance of previous executions of block 141, a configuration for the implementation, etc.

If the set of identifiers includes an identifier for the consumer as determined in block 144, flow passes to block 147 and the event is added to a data structure associated with the consumer. A data structure organizes and stores data either temporarily or permanently. Examples of data structures include a queue, a map, a tree, a list, an array, etc. Some data structures may support different ordering semantics. For example, a list or queue may be implemented such that the a first entry (e.g., an event) which is added 1) will be retrieved before a second entry (e.g., another event) which is added will be retrieved (also known as "first-in, first-out" (FIFO) semantics) or 2) after the second entry will be retrieved (also known as "last-in, first-out (LIFO) semantics). A map or tree may organize and store entries to favor some operations over others (e.g., to favor faster additions to the map or tree over removals). A data structure may include functionality that transmits any entries the structure includes (e.g., via a network socket, via HyperText Transfer Protocol (HTTP) messaging, via messages, etc.); in other implementations, that functionality may be separate from a data structure and act on it. To favor transmitting to a consumer (or having a consumer receive) events in the order in which they are added to the data structure, an event can be transmitted (or received) in the order in which the event is added (e.g., with FIFO semantics). Such an order may approximate a chronological order in which an event is retrieved from a source of events, added to the source of events, and/or published, relative to other events that relate to the topic.

Returning to FIG. 1A, the first event is added to a subset of the data structures 150. FIG. 1A shows several data structures 153A-N: data structure 153A, data structure 153B, data structure 153J, and data structure 153N (each shown abbreviated with "struct"). Each of these data structures are associated with a respective one of the consumers subscribed to the topic 159A-N. Consumer 159A has an ID shown with value "1"; consumer 159B has an ID shown with value "4"; consumer 159J has an ID shown with value "2"; and consumer 159N has an ID shown with value "X." First event 115A includes, in the set of IDs for intended recipients 136A-C, IDs with values "1," "4," and "2"; i.e., the IDs for consumers 159A, 159B, and 159J respectively. When block 144 is performed for each of these consumers, the set of IDs included in the first event is determined as including an ID for the consumer and in block 147, the first event is added to the data structure associated with that consumer. Consequently, first event 115A is added to data structures 153A, 153B, and 153J (which are associated with consumers 159A, 159B, and 159J), but not to data structure 153N. Thus, the first event is added to a subset of the data structures 153A-N.

Although FIG. 1A shows that the first event is added to a subset of data structures 150, the adding may occur iteratively (e.g., when block 147 is executed) or in bulk (e.g., by identifying the data structures to which the event is to be added, then adding the event to those data structures). Other implementations may not include data structures but support different ways of delivering events to consumers (e.g., deliver events to consumers without adding the events to data structures, such as transmitting an event to a consumer without adding the event to a data structure as an intermediate step).

With reference to FIG. 1B, from block 141, flow passes to block 176. In block 176, the event (e.g., first event 115A) is delivered to only a subset of all of the consumers (e.g., consumers 159A, 159B, and 159J) that corresponds to the intended recipients (e.g., consumers with IDs "1," "4," and "2") based on a subset of the data structures to which the event was added (e.g., data structures 153A, 153B, and 153J). Delivering an event to a consumer means sending an event to or making an event available for a consumer such that the consumer can consume the event. Thus, implementations allow for selective delivery of an event to consumers, based on an attribute included in the event (or lack thereof) and the set of IDs for intended recipients for the event (or lack thereof).

One of skill in the art will recognize that delivery to a subset of all of the consumers is dependent on the set of IDs including fewer identifiers than for all of the consumers. Feasibly, IDs for all of the consumers could be included in the set of IDs, in which case, block 176 would include delivering the event to all of the consumers that correspond to the intended recipients. On its face, including IDs for all consumers in the set of IDs appears not to provide advantages over topic-based filtering in pub-sub systems (or over including an empty set of IDs, omitting a set of IDs, or omitting the attribute). But the consumers subscribed to a topic at a given time may not be the same consumers subscribed to the topic at an earlier or later time. For an illustrative example, published events may later be "replayed" (e.g., delivered to one or more consumers again responsive to receiving a request). Since the time that the replayed events were published, subscription to the topic to which the event relates may have changed. If the event did not include intended recipients, some implementations may replay the event to the consumers currently subscribed to the topic rather than those subscribed when the events were first delivered (and thus one or more consumers which requested the replay might receive events which they were not subscribed to receive at the time the events were first delivered, and/or one or more consumers might not receive events which they were subscribed to receive at that time). Thus, including IDs for all consumers in the set of IDs for intended recipients will effectively fix the intended recipients in time and replaying the events will result in the event being replayed to the same intended recipients. Implementations which support replaying events may support different options of course; e.g., replaying events to those consumers subscribed at the time the events were first delivered, replaying events to currently-subscribed consumers that were also subscribed at that time, replaying events to consumers subscribed at that time that are also currently-subscribed, etc.

Delivering an event to only a subset of consumers contrasts with how pub-sub systems typically operate. As mentioned, typical pub-sub systems perform topic-based filtering. In such a system, an event associated with a topic will be delivered to all of the consumers subscribed to the event. Delivering an event to only a subset of consumers, based on IDs for consumers included in an attribute of the event, allows the publisher of the event more flexibility. For example, the publisher can choose to have an event delivered to any combination of consumers subscribed to the event topic, rather than choosing whether to publish an event to all consumers (or none). This fine-grained level of control does not require creating additional topics and is not bounded by limits on the number of topics that can be created in the pub-sub system. A publisher can also specify different sets of intended recipients for different events (e.g., a publisher can specify intended recipients of an event on a per-event basis). A given event may be more relevant to a subset of all the consumers subscribed to the topic, or the event may be of a nature such that the event should only be delivered to a subset of all the consumers (e.g., the event includes confidential data). From a consumer's perspective, the informational content of an event received by the consumer is also enhanced because the consumer was an intended recipient for the event: this has significance compared to the event being published for all consumers subscribed to the topic. The events that the consumer receives are also more relevant. Improved relevancy reduces costs associated with receiving less relevant events. For example, a consumer may process a less relevant event only to discard it, representing wasted computing resources (both for the consumer and the pub-sub system in terms of processing and network communications). Avoiding waste of computing resources is particularly salient for electronic devices with relatively limited processing power (e.g., a cellular telephone), when events are published and delivered at relatively high rates and/or volumes, and/or in systems with a relatively large number of publishers and/or consumers.

Implementations also support delivering an event where the event does not include an attribute which includes a set of IDs for intended recipients of the event, and/or the event does include such an attribute but the set of IDs is empty. This support can be useful to ensure that events published by legacy publishers are delivered as they would have been delivered in the legacy systems. This support is also useful to provide an additional option to publishers, however; if a publisher intends an event to be delivered to all of the consumers subscribed to a topic, the publisher can omit an attribute which includes a set of IDs for intended recipients (or include the attribute but omit the set of IDs or include an empty set of IDs). Other implementations are possible. For example, some implementations might not deliver an event when the event does not include an attribute which includes a set of IDs for intended recipients, and/or the set of IDs is empty.

Returning to FIG. 1B, if an attribute of an event does not include a set of one or more identifiers for intended recipients of the event (or includes an empty set), flow passes from block 139, 170, or 173 to block 179. In block 179, the event is added to each of the data structures (i.e., the data structures for the consumers subscribed to the topic). From block 179, flow passes to block 182 and the event is delivered to all of the consumers (i.e., that are subscribed to the topic). Thus, in the example shown in FIG. 1A, second event 115B does not include a set of IDs for intended recipients, includes an empty set of IDs, and/or does not include an attribute which includes a set of IDs. After block 139 is executed, the second event is added to each of the data structures 156. Specifically, second event 115B is added to data structures 153A-N(second event 115B is shown as added to data structures 153A, 153B, 153J, and 153N for brevity). Second event 115B is then delivered to all of the consumers subscribed to the topic 159A-N(cf. block 182).

Although FIG. 1B shows that the event is delivered to all of the consumers in block 182, those of skill in the art will recognize that delivering the event may occur iteratively (e.g., the event is delivered to a given one of all of the consumers, then another of all of the consumers, etc.) or in bulk (e.g., in implementations which include a data structure associated with all of the consumers). Also, implementations may include optional block 185, in which the event (e.g., first event 115A in FIG. 1A) is delivered to only a subset of all of the consumers that corresponds to the intended recipients based on a subset of the structures to which the event was added and another event (e.g., second event 115B in FIG. 1A) to all of the consumers. Thus, operations to deliver multiple events can be combined (and thus more than one event delivered to a given consumer in bulk). Combining operations may improve performance by reducing the number of operations on the data structures, of writes to input-output ports, of network traffic, etc.

Headers

Figure 2A:
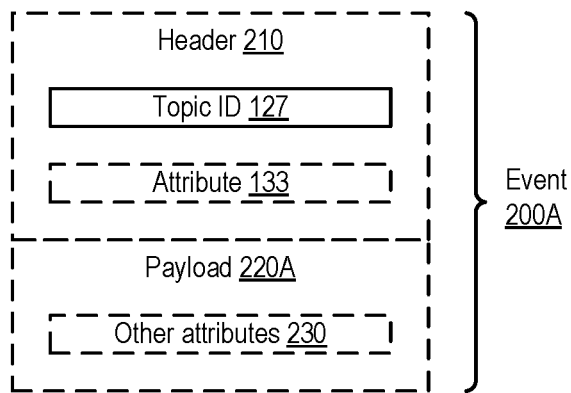
FIG. 2A is a block diagram showing an event with a header, according to some example implementations.

FIG. 2A is a block diagram showing an event with a header, according to some example implementations. A header is a portion of an event which typically contains one or more attributes that describe the event (e.g., a time that the event was created, a version, a set of intended recipients, etc.). FIG. 2A shows event 200A which includes a header 210 and a body 220. Header 210 includes an attribute 133 (i.e., with reference to FIG. 1A, an attribute that includes a set of IDs for intended recipients for the event) and a topic ID 127 (i.e., an identifier for the topic to which event 200A relates). The payload 220A includes other attributes 230. Other implementations (not shown) may include other attributes in header 210 (e.g., a creation time, a version, etc.) and/or include topic ID 127 in payload 220A rather than header 210.

The structure of event 200A (i.e., the event having a header separate from the payload or body of the event) is potentially useful because the attributes stored in the header and the body are of interest to different components, and those components can then look to the header and/or body for those attributes. The header (if implemented) is of interest to server 106 (e.g., for performing recipient-based filtering based on attribute 133). The header may also be of interest to the source of events 103 (e.g., for categorizing, storing, and/or making available event 200A based on the header and/or its contents). The header may be of interest to the publisher of the event (not shown in FIG. 1A) for specifying the topic ID 127 and/or attribute 133. By specifying a header, components such as server 100, source of events 103, server 106, etc. can identify a portion of an event which is expected to contain information of interest.

Including a header in an event can also allow the header and the body of the event to be encrypted separately. Encrypting data means to encode it such that only authorized entities can decrypt it (and decrypting data means to decode encrypted data such that it can be read). In one implementation, an event's header may be unencrypted and the event's body encrypted. In another implementation, an event's header and body may be encrypted, but encrypted separately (i.e., using different ciphers, using different public-private key pairs, etc.). Either of these implementations provide for encrypted transmission of the event's payload. In the latter implementation, the header can be decrypted (e.g., to perform recipient-based filtering) without decrypting the payload (and thus risking data security, for example).

Encryption and decryption may be performed using a variety of techniques; e.g., symmetric key and/or asymmetric key techniques. Where symmetric key techniques are used, the encryption/decryption key is shared between the component that encrypts the header and/or payload of the event (e.g., one or more of the publisher of the event, server 100, the source of events 103, etc.) and the component that decrypts the header and/or payload (e.g., server 106 and/or one or more of consumers subscribed to a topic 159A-N). Where asymmetric key techniques are used, the component that encrypts the header and/or payload uses a different key from that used by the component that decrypts the header and/or payload (e.g., in public key encryption, where the component that decrypts has a private key for decryption, and the component that encrypts has a public key for encryption (that is provided by the component that decrypts)).

Since the header and payload can be encrypted and decrypted separately, when both are encrypted, 1) one or more components may encrypt the header and payload, and 2) one or more other components may decrypt the header and payload. For example, the publisher of an event may encrypt the payload of an event with a public key provided by a consumer which is an intended recipient of the event, and server 100 or the source of events 103 may encrypt the header of the event with a public key provided by server 106. Then server 106 may decrypt the header of the event with a private key corresponding to the public key that the server provided, and the consumer which is the intended recipient may decrypt the payload of the event with the private key corresponding to the public key that the consumer provided to the publisher. Other implementations are possible (e.g., a shared key is used by multiple consumers to decrypt a payload of an event that is delivered to those consumers, the server decrypts both the header and payload of an event and delivers the event to one or more consumers securely (e.g., using transport layer security (TLS), secure sockets layer (SSL) technology, by re-encrypting the payload such that the consumers can decrypt it, etc.).

Figure 2B:
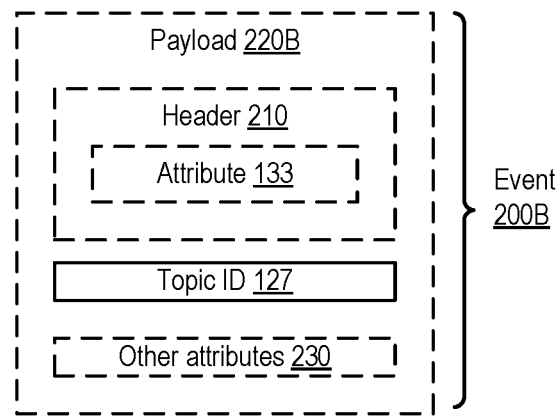
FIG. 2B is a block diagram showing an event with an embedded header, according to some example implementations.

In contrast to FIG. 2A, FIG. 2B shows an event with an embedded header, according to some example implementations. Specifically, header 210 is included in payload 220B of event 200B together with topic ID 127 and other attributes 230. Alternatively, event 200B might not include header 210 and attribute 133 is stored in the body of the event (i.e., in payload 220B). Implementations herein might be based on using an existing pub-sub system which does not support including a header in an event such as shown in FIG. 2A. In those systems, an attribute for an event can be included in the event's payload (as shown in FIG. 2B) to provide the advantages of using recipient-based filtering.

A header may also be useful for serialization. Referring to FIG. 1A, an event may be transmitted at various stages. For example, server 100 adds the first event 115A to the source of events 103; server 106 retrieves the first event from the source of events; and server 106 delivers the first event to a subset of the consumers subscribed to a topic 159A-N. An event may be serialized to be transmitted. Serializing an event means converting it from a format (e.g., JavaScript Object Notation (JSON), plain text, eXtensible Markup Language (XML), an object in an object-oriented programming language, etc.) to another format (e.g., a binary-encoded format) for transmission. Deserializing an event means converting it to another format (e.g., JSON, plain text, XML, etc.) from the format (e.g., a binary-encoded format) in which the event was transmitted. Serializing an event may reduce its size, thus meaning that less data is transmitted to transmit the event. By including a header, the header may be deserialized separately from the body of an event.

Figure 2C:
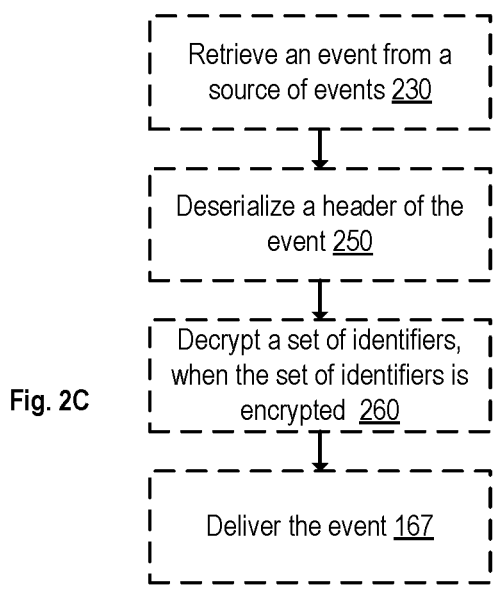
FIG. 2C is a flow diagram showing operations for retrieving an event from a source of events, according to some example implementations.

FIG. 2C shows operations for retrieving an event from a source of events, according to some example implementations. In block 240, an event is retrieved from a source of events. From block 240, flow passes to block 250. In block 250, a header of the event is deserialized. In some implementations, the header is deserialized once (e.g., by server 106). Deserializing the header once is more efficient than deserializing the header multiple times (e.g., for each consumer to which the event is to be delivered).

From block 250, flow passes to block 260. In block 260, a set of identifiers is decrypted when the set of identifiers is encrypted. Decrypting the set of identifiers may include applying such techniques as previously described.

From block 260, flow passes to block 167 (shown in more detail in FIG. 1B) and the event is delivered. By using one or more of the optional blocks shown in FIG. 2C, implementations can promote data security and more efficient data transmission when delivering the event.

Exemplary Applications

FIG. 3 is a diagram showing an exemplary application using recipient-based filtering in a publish-subscribe messaging system. More specifically, FIG. 3 shows recipient-based filtering in the context of multiple users viewing and editing a document (document 330) via different instances of an application (application instances 315A-D of application 310).

Organization 300 includes users viewing the document 305A-D and other users not viewing the document 305E-N. An organization is a collection of one or more natural and/or legal persons acting with a common purpose; e.g., a business entity. Each of the users viewing the document 305A-D is using a respective one of application instances 315A-D, each of which includes a respective one of consumers 325A-D of a first group of consumers 320A to view document 330. The other users not viewing the document 305E-N are associated with a second group of consumers 320B. A document is an electronic record; e.g., of alphanumeric characters. Examples of documents include text files, accounting records, spreadsheets, etc.

FIG. 3 also shows detail of an exemplary one of the application instances 315A-D; i.e., application instance 315D. In block 340, an edit to the document (e.g., document 330) is received from the user viewing the document (i.e., the user viewing the document through application instance 315D, i.e., user 305D). Responsive to receiving the edit to the document, flow passes from block 340 to block 345. In block 345, a request to publish a first event relating to the edit of the document (i.e., request to publish first event 350) is submitted to server 100 (shown in FIG. 1A). By way of example, the data to be included as the payload of the first event may include one or more attributes indicating 1) that the document has been edited, 2) the nature of the edit, 3) the time of the edit, 4) information to identify user 315D as the author of the edit, etc.

Block 345 optionally includes block 355, wherein a set of identifiers for the intended recipients for the first event is automatically selected. In block 360, the identifiers are based on consumers associated with the users viewing the document (i.e., users viewing the document 305A-D). In some implementations, application instance 315D receives an indication of the others of the users viewing the documents 305A-C through the application instances used by the others of the users (i.e., application instances 315A-C). In other implementations, application instance 315D receives such an indication in other ways (e.g., through document 330 which may store indications of the users which are currently viewing the document).

Responsive to receiving the request to publish the first event 350, in some implementations, server 100 adds the first event 365 to source of events 103 (described elsewhere herein). In other implementations, block 118 is executed and a set of identifiers for the intended recipients for the first event is automatically selected before the first event is added to the source of events 103. In such implementations, the automatically selecting may occur additionally or alternatively to the automatically selecting performed in block 355 (and optionally block 360) of application instance 315D. In the context of the exemplary application shown in FIG. 3, the automatically selecting may be based on the first group of consumers 320A due to 1) those consumers registering with server 100 when application instances 315A-D were launched, 2) application 315D previously having sent similar messages to the first group of consumers 320 (e.g., other messages relating to an edit of the document); 3) the first group of consumers being flagged as active (e.g., because they were included in a set of IDs for other messages in a recent period of time); etc. If block 118 is performed additionally to block 355 (and optionally block 360), different rules may apply to determine which IDs from the sets of IDs automatically selected in blocks 355 and 118 are included in the first event. For example, the IDs representing the intersection of the sets might be included in the first event, the set of IDs representing the union of the sets might be included in the first event, the IDs in only one and not the other of the sets might be included in the first event, etc.

The first event 365 is retrieved from the source of events 103 by server 106 (described elsewhere herein). In block 370, the first event is delivered to the first group of consumers 320A (i.e., the consumers included in the application instances 315A-D used by the users viewing the document 305A-D). The first event 365 may be more relevant to the users viewing the document (and/or the respective application instances they are using) than to the other users not viewing the document. For example, application instances 315A-C may wish to perform one or more operations responsive to receiving first event 365, such as reflecting the edit of the document in the copies of document 330 displayed in those application instances, indicating to the users of the application instances that an edit has been made, etc. In contrast, an edit to a document that a user is not viewing might not be relevant to the user.

In block 375, an indication is received by application instance 315D that the document 330 is no longer being edited. In some implementations, this indication may be received because a period of time has elapsed during which no edit has been made; application instance 315D is the only application instance with document 330 open; application instances 315A-C have shut down and application instance 315D is being shut down; etc. From block 375, flow passes to block 380.

In block 380, another request is submitted to publish a second event relating to the editing of the document being completed (i.e., request to publish second event 385). By way of example, the data to be included as the payload of the second event may include one or more attributes that indicate 1) that the document has been edited, 2) that the editing of the document has been completed, 3) the nature of the edit(s) to the document; 4) the time(s) of any edits to the document, 5) information to identify the user(s) who performed the edits; etc.

Block 380 optionally includes block 387, wherein a set of identifiers for the intended recipients for the second event is automatically selected. In block 389, the identifiers are based on consumers associated with the users viewing the document (i.e., users viewing the document 305A-D) and on the other users not viewing the document 350E-N. In some implementations, application instance 315D receives an indication of the other users not viewing the document from a directory (e.g., of users in the organization 300), from metadata relating to document 330 (e.g., users who have opened, viewed, and/or edited document 330), from an identity and access management system, from a database (e.g., which stores document 330, which stores a list of users that have indicated an interest in the document), etc.

Responsive to receiving the request to publish the second event 385, in some implementations, server 100 adds the second event 390 to source of events 103 (described elsewhere herein). In other implementations, block 118 is executed and a set of identifiers for the intended recipients for the second event is automatically selected before the second event is added to the source of events 103. In such implementations, the automatically selecting may occur additionally or alternatively to the automatically selecting performed in block 355 (and optionally block 360) of application instance 315D. In the context of the exemplary application shown in FIG. 3, the automatically selecting may be based on the first and second groups of consumers 320A and 320B due to 1) the first group of consumers registering with server 100 when application instances 315A-D were launched, 2) application 315D previously having sent similar messages to the first and second groups of consumers (e.g., other messages relating to editing of a document being completed); 3) the first and/or second groups of consumers being flagged as active (e.g., because they were included in a set of IDs for other messages in a recent period of time); 4) a rule (e.g., received by server 100) for automatically generating sets of IDs for events relating to editing of a document being completed; etc. If block 118 is performed additionally to block 355 (and optionally block 360), different rules may apply to determine which IDs from the sets of IDs automatically selected in blocks 355 and 118 are included in the second event, as previously discussed.

After the second event 390 is added to source of events 103, the second event 390 is retrieved from the source of events 103 by server 106 (described elsewhere herein).

In block 395, the second event is delivered to the first group of consumers (i.e., the consumers included in the application instances 315A-D used by the users viewing the document 305A-D) and the second group of consumers 320B (i.e., the consumers with which the other users not viewing the document 305E-N are associated). The second event 390 may be relevant to both the first and second groups of consumers. For example, the second event may be relevant to the first group of consumers because the application instances which include the consumers of the first group may perform operations responsive to receiving the second event (e.g., indicate to the instances' respective users that editing has been completed). The second event may also be relevant to the second group of consumers; e.g., to indicate to the other users that document 330 was edited, to initiate a workflow whereby any edits to the document are reviewed, to generate and send emails or other forms of notification to the other users, etc.

Thus, FIG. 3 shows 1) an application instance causing the publication of a first event to a set of intended recipients, 2) automatic selection of that set of intended recipients by the application instance 315D and/or server 100, and 3) selective delivery of the first event to those intended recipients. FIG. 3 also shows 1) an application instance causing the publication of a second event to a different set of intended recipients, 2) automatic selection of that different set of intended recipients, and 3) selective delivery of the second event to those intended recipients.

An application such as that described in FIG. 3 illustrates some of the advantages of the implementations described herein. The first event 365 may be more relevant to the users viewing the document (and/or the respective application instances they are using) than to the other users not viewing the document, whereas the second event may be relevant to both groups of users. In contrast with a typical pub-sub system, the exemplary application 310 provides finer-grained control over delivery of the first and second events to consumers by performing recipient-based filtering. In doing so, the application improves the relevance of the event for the consumers and avoids wasteful delivery of events (e.g., delivery to users who are not viewing the document of an event which relates to an edit of the document).

Example Electronic Devices and Environments

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device)

as a client may be referred to as client software or client code. A server provides one or more services to (also referred to as serves) one or more clients.

The term "user" refers to an entity (e.g., an individual person) that uses an electronic device, and software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
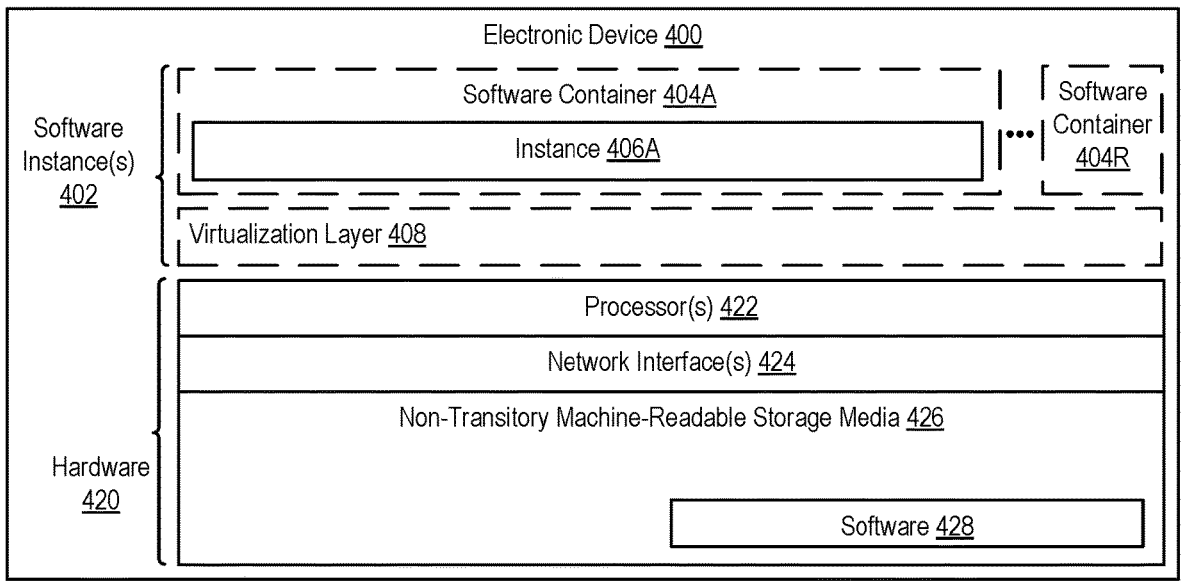
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). One or more implementations described herein may be implemented as a service (e.g., a recipient-based filtering service). Each of the previously described server(s) and source of events may be implemented in one or more electronic devices 400. In one implementation, server 106 can be part of a recipient-based filtering service. In some implementations, the recipient-based filtering service may include the source of messages 103. Additionally or alternatively, the recipient-based filtering service may include server 100. In other implementations, 1) the recipient-based filtering service may include any combination of one or more of server 100, source of events 103, and server 106; and 2) those of server 100, source of events 103, and server 106 not included in the combination are implemented as separate services to the recipient-based filtering service. In one implementation the recipient-based filtering service can be available to one or more clients (such as consumers). In one implementation: 1) each of the clients is implemented in a separate one of the electronic devices 400 (e.g., in end user devices where the software 428 represents the software to implement clients to interface directly and/or indirectly with the recipient-based filtering service (e.g., software 428 represents a web browser, a native client, a portal, a command-line interface, and/or API based upon protocols such as Simple Object Access Protocol (SOAP), REpresentational State Transfer (REST), etc.)); 2) the recipient-based filtering service is implemented in a separate set of one or more of the electronic devices 400 (e.g., a set of one or more server devices where the software 428 represents the software to implement the recipient-based filtering service); and 3) in operation, the electronic devices implementing the clients and the recipient-based filtering service would be communicatively coupled (e.g., by a network) and would establish between them (or through one or more other layers and/or or other services) connections for submitting event(s) and/or data therefor to the recipient-based filtering service and event(s) being delivered to the clients. Other configurations of electronic devices may be used in other implementations (e.g., an implementation in which the client and the recipient-based filtering service are implemented on a single electronic device 400).

During operation an instance of the software 428 (illustrated as instance 406A and also referred to as a software instance; and in the more specific case of an application, as an application instance) is executed. In electronic devices that use compute virtualization, the set of one or more processor(s) 422 typically execute software to instantiate a virtualization layer 408 and software container(s) 404A-R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 428 is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
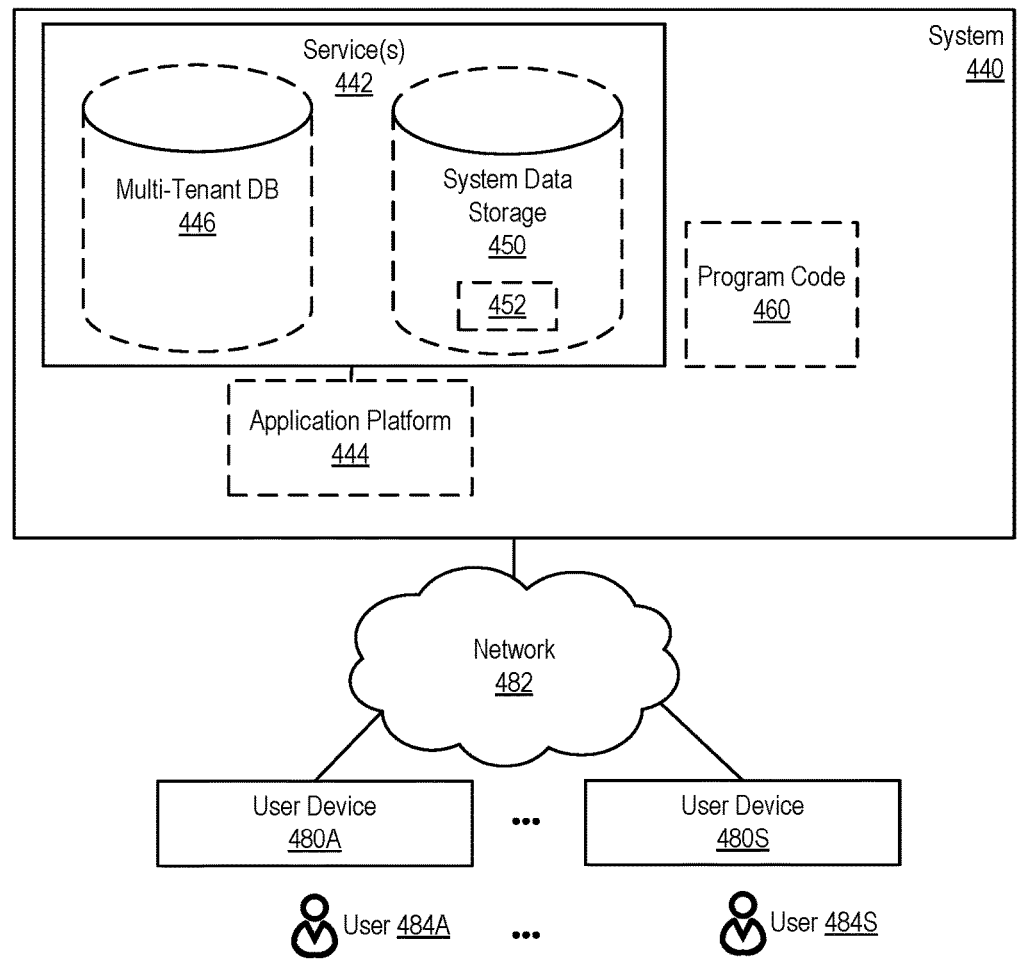
FIG. 4B is a block diagram of a deployment environment according to some example implementations.

FIG. 4B is a block diagram of a deployment environment according to some example implementations. A system 440 includes hardware (e.g, a set of one or more server devices) and software to provide service(s) 442, including the recipient-based filtering service. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third party datacenter(s), which are datacenter(s) owned and/or operated by one or more different entities than the entity that provides the service(s) 442 (e.g., the different entities may host some or all of the software provided and/or operated by the entity that provides the service(s) 442). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-S over a network 482. The service(s) 442 may be on-demand services that are made available to one or more of the users 484A-S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-S). The service(s) 442 may communicate with each other and/or with one or more of the user devices 480A-S via one or more APIs (e.g., a REST API). The user devices 480A-S are operated by users 484A-S.

In some implementations the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to as a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following:

| Type of Service | Example Service(s) by salesforce.com, inc. |
|---|---|
| Customer relationship management (CRM) | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |

-continued

| Type of Service | Example Service(s) by salesforce.com, inc. |
|---|---|
| Database-as-a-Service Data-as-a-Service (DAAS or DaaS) | Database.com ™ Data.com |
| Platform-as-a-service (PAAS or PaaS) | Heroku ™ Enterprise, Thunder, Force.com ®, Lightning, recipient-based filtering |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 440 may include an application platform 444 that enables PAAS for creating, managing, and executing one or more applications developed by the provider of the application platform 444, users accessing the system 440 via one or more of user electronic devices 480A-S, or third-party application developers accessing the system 440 via one or more of user electronic devices 480A-S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user electronic device 480A-S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the one or more multi-tenant database 446 and/or system data storage 450.

In some implementations, the service(s) 442 are implemented using virtual applications dynamically created at run time responsive to queries from the user electronic devices 480A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the recipient-based filtering service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user electronic devices 480A-S.

Each user electronic device 480A-S(such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow a user 484 to interact with various GUI pages that may be presented to a user 484. User electronic devices 480A-S might communicate with system 440 using TCP/IP (Transfer Control Protocol and Internet Protocol) and, at a higher network level, use other networking protocols to communicate, such as HTTP, File Transfer Protocol (FTP), Andrew File System (AFS), Wireless Application Protocol (WAP), Network File System (NFS), an application program interface (API) based upon protocols such as Simple Object Access Protocol (SOAP), REST, etc. In an example where HTTP is used, one or more user electronic devices 480A-S might include an HTTP client, commonly referred to as a "browser," for sending and receiving HTTP messages to and from server(s) of system 440, thus allowing users 484 of the user electronic device 480A-S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method in a server of a publish-subscribe messaging system for recipient-based filtering of a message that relates to a topic to which consumers are subscribed, the method comprising:

receiving a request to publish a message in the publish-subscribe messaging system according to the topic;

automatically selecting a set of one or more consumer identifiers for intended recipients for the message;

adding the set of consumer identifiers to the message; and adding the message to an event bus, wherein the message is to be delivered to only a subset of all of the consumers that are subscribed to the topic based on the added consumer identifiers.

2. The method of claim 1, wherein the adding the set of consumer identifiers to the message includes:
adding the set of consumer identifiers to an attribute of a body of the message.

3. The method of claim 1, wherein the adding the set of consumer identifiers to the message includes:
adding the set of consumer identifiers to an attribute of a header of the message.

4. The method of claim 1, wherein the set of consumer identifiers is encrypted and a remaining portion of the message is encrypted separately.

5. The method of claim 1, wherein the automatically selecting the set of consumer identifiers is performed based on one or more of the topic, a publisher of the message, consumer identifiers included in one or more messages that share common attributes with the message, one or more consumers that have registered with a server of the publish-subscribe messaging system, one or more consumers that are active.

6. The method of claim 1, wherein the automatically selecting the set of consumer identifiers is performed to enforce privileges accorded to one or more of a publisher of the message and the intended recipients.

7. A non-transitory machine-readable medium that provides instructions that, when executed by a processor, are capable of causing the processor to perform operations for recipient-based filtering of a message that relates to a topic to which consumers are subscribed, the operations comprising:
receiving a request to publish a message in a publish-subscribe messaging system according to the topic;
automatically selecting a set of one or more consumer identifiers for intended recipients for the message;
adding the set of consumer identifiers to the message; and
adding the message to an event bus, wherein the message is to be delivered to only a subset of all of the consumers that are subscribed to the topic based on the added consumer identifiers.

8. The non-transitory machine-readable medium of claim 7, wherein the adding the set of consumer identifiers to the message includes:
adding the set of consumer identifiers to an attribute of a body of the message.

9. The non-transitory machine-readable medium of claim 7, wherein the adding the set of consumer identifiers to the message includes:
adding the set of consumer identifiers to an attribute of a header of the message.

10. The non-transitory machine-readable medium of claim 7, wherein the set of consumer identifiers is encrypted and a remaining portion of the message is encrypted separately.

11. The non-transitory machine-readable medium of claim 7, wherein the automatically selecting the set of consumer identifiers is performed based on one or more of the topic, a publisher of the message, consumer identifiers included in one or more messages that share common attributes with the message, one or more consumers that have registered with a server of the publish-subscribe messaging system, one or more consumers that are active.

12. The non-transitory machine-readable medium of claim 7, wherein the automatically selecting the set of consumer identifiers is performed to enforce privileges accorded to one or more of a publisher of the message and the intended recipients.

13. An electronic device operating as a server of a publish-subscribe messaging system for recipient-based filtering of a message that relates to a topic to which consumers are subscribed, the electronic device comprising:
a non-transitory machine-readable medium that provides instructions that, when executed by a processor, are capable of causing the processor to perform operations comprising:
receiving a request to publish a message in the publish-subscribe messaging system according to the topic;
automatically selecting a set of one or more consumer identifiers for intended recipients for the message;
adding the set of consumer identifiers to the message; and
adding the message to an event bus, wherein the message is to be delivered to only a subset of all of the consumers that are subscribed to the topic based on the added consumer identifiers.

14. The electronic device of claim 13, wherein the adding the set of consumer identifiers to the message includes:
adding the set of consumer identifiers to an attribute of a body of the message.

15. The electronic device of claim 13, wherein the adding the set of consumer identifiers to the message includes:
adding the set of consumer identifiers to an attribute of a header of the message.

16. The electronic device of claim 13, wherein the set of consumer identifiers is encrypted and a remaining portion of the message is encrypted separately.

17. The electronic device of claim 13, wherein the automatically selecting the set of consumer identifiers is performed based on one or more of the topic, a publisher of the message, consumer identifiers included in one or more messages that share common attributes with the message, one or more consumers that have registered with a server of the publish-subscribe messaging system, one or more consumers that are active.

18. The electronic device of claim 13, wherein the automatically selecting the set of consumer identifiers is performed to enforce privileges accorded to one or more of a publisher of the message and the intended recipients.

\* \* \* \* \*